US008384666B2

(12) United States Patent
Itoh et al.

(10) Patent No.: US 8,384,666 B2
(45) Date of Patent: Feb. 26, 2013

(54) INPUT DEVICE FOR OPERATING IN-VEHICLE APPARATUS

(75) Inventors: Masahiro Itoh, Ichinomiya (JP); Nozomi Kitagawa, Okazaki (JP); Shigeaki Nishihashi, Nagoya (JP); Takeshi Yamamoto, Anjo (JP); Takeshi Haruyama, Kariya (JP)

(73) Assignee: DENSO CORPORATION, Kariya (JP)

(*) Notice: Subject to any disclaimer, the term of this patent is extended or adjusted under 35 U.S.C. 154(b) by 412 days.

(21) Appl. No.: 12/453,524

(22) Filed: May 14, 2009

(65) Prior Publication Data
US 2009/0284467 A1 Nov. 19, 2009

(30) Foreign Application Priority Data

May 14, 2008 (JP) ................. 2008-127338

(51) Int. Cl.
*G06F 3/033* (2006.01)
*G09G 5/00* (2006.01)
*G06F 3/041* (2006.01)

(52) U.S. Cl. ........ 345/157; 345/156; 345/158; 345/161; 345/173

(58) Field of Classification Search .......... 345/156–158, 345/161, 163–167; 715/828–863
See application file for complete search history.

(56) References Cited

U.S. PATENT DOCUMENTS

| | | | | |
|---|---|---|---|---|
| 4,652,871 A | * | 3/1987 | Tsukada et al. ............... 345/164 |
| 5,757,359 A | * | 5/1998 | Morimoto et al. ............ 345/156 |
| 5,777,605 A | * | 7/1998 | Yoshinobu et al. ........... 345/173 |
| 6,088,023 A | * | 7/2000 | Louis et al. .................... 345/173 |
| 6,225,976 B1 | * | 5/2001 | Yates et al. .................... 345/156 |
| 7,218,248 B2 | * | 5/2007 | Kong et al. ...................... 341/22 |
| 2003/0214526 A1 | * | 11/2003 | Numata et al. ................ 345/701 |
| 2007/0132724 A1 | | 6/2007 | Muranaka |

(Continued)

FOREIGN PATENT DOCUMENTS

| | | |
|---|---|---|
| JP | A-62-224820 | 10/1987 |
| JP | A-05-298014 | 11/1993 |
| JP | A-09-258901 | 10/1997 |
| JP | A-11-212726 | 8/1999 |

(Continued)

OTHER PUBLICATIONS

Notification of Reason for Refusal issued from the Japanese Patent Office on Feb. 9, 2010 in the corresponding Japanese patent application No. 2008-127338 (with English translation thereof).

*Primary Examiner* — Alexander S Beck
*Assistant Examiner* — Nguyen H Truong
(74) *Attorney, Agent, or Firm* — Posz Law Group, PLC

(57) ABSTRACT

An input device having a manipulation member is disclosed. The input device has an absolute input mode and a relative input. In the absolute input mode, the input device determines a coordinate of a pointed point on a window of a display unit based on a coordinate of the manipulation member. In the relative input mode, the input device determines the pointed point on the window in a relative manner based on a two-dimensional displacement of the manipulation member with respect to a reference position, which is set when an input mode is switched into the relative input mode. When the manipulation member receives a load that causes the manipulation member to move beyond a predetermined range, the input device generates and applies a force corresponding to the load to the manipulation member.

12 Claims, 9 Drawing Sheets

U.S. PATENT DOCUMENTS

| | | | |
|---|---|---|---|
| 2008/0007484 A1* | 1/2008 | Iwakura | 345/5 |
| 2008/0148187 A1* | 6/2008 | Miyata et al. | 715/840 |
| 2009/0060456 A1* | 3/2009 | Kim | 386/96 |
| 2009/0063359 A1* | 3/2009 | Connors | 705/36 R |
| 2009/0262086 A1* | 10/2009 | Chen | 345/173 |

FOREIGN PATENT DOCUMENTS

| | | | |
|---|---|---|---|
| JP | 2004-157944 | * | 3/2004 |
| JP | A-2004-157944 | | 6/2004 |
| JP | A-2006-29917 | | 2/2006 |

* cited by examiner

INPUT DEVICE FOR OPERATING IN-VEHICLE APPARATUS

CROSS REFERENCE TO RELATED APPLICATION

The present application is based on Japanese Patent Application No. 2008-127338 filed on May 14, 2008, the disclosure of which is incorporated herein by reference.

BACKGROUND OF THE INVENTION

1. Field of the Invention

The present invention relates to an input device for operating an in-vehicle apparatus.

2. Description of Related Art

Modern vehicles are equipped with in-vehicle apparatuses, such as a navigation apparatus, an air conditioner, an audio apparatus and the like. There is known a system that has a display part (e.g., Liquid Crystal Display part) and an input part spaced apart from each other. Using the system, a user can operate the in-vehicle apparatus by manipulating the input part and by pointing an item on a window displayed on a display screen of the display part.

Regarding the above type of systems, in order to minimize movement of viewpoint of a driver, it may be preferable to place the display screen in front of the driver and as far as possible from the driver. Further, it is may be preferable to place the input part within a driver arm's reach, and preferable that a driver be not required to take a look at the input part to manipulate the input part.

The above type of systems frequently employs the following operational manners: a user manipulates the input part to move a cursor, which indicates a pointed point on the window; the cursor is moved onto an icon, which represents an instruction to the in-vehicle apparatus; and the icon is selected to issue the instruction. According to the above operational manners, however, it takes time and effort to move the cursor to a target position. Thus, the above manners can increase a time for a driver to gaze the window.

JP-A-2006-29917 discloses the following system. A selectable item such as an icon is displayed on a window of a display means. A user can select the selectable item by manipulating a touch-sensitive panel spaced apart from the display means. When a vehicle is traveling, an input operation is based on absolute positional data, which indicates absolute positions on the touch-sensitive panel. When a vehicle is making a stop, an input operation is based on relative positional data, which indicates relative positions on the touch-sensitive panel. An input operation based on absolute positions is also referred to herein as an absolute input. An input operation based on relative positions is also referred to herein as a relative input. JP-A-2006-29917 argues that it is possible to improve operability by switching an input manner between an absolute input manner and a relative input manner depending on whether a vehicle is traveling or making a stop.

There is, however, a remarkable difference in operational feeling between the known absolute input manner and the known relative input manner. When an input part employs an input manner as a mixture of the absolute and relative inputs, or when an input part switches the input manner between the absolute input manner and the relative input manner, it may be difficult for a user in some cases to catch whether the present input is involved in the absolute input manner or the relative input manner. In such a case, a user may be confused or may have discomfort feeling.

SUMMARY OF THE INVENTION

In view of the above and other difficulties, it is an objective of the present invention to provide an input device that is capable of reducing a time and an effort for operation, minimizing discomfort feeling caused by input mode switching, and providing intuitive operational feeling.

According to an aspect of the present invention, an input device for a vehicle is provided. The input device is communicatable with an in-vehicle apparatus of the vehicle and an external display unit that displays a window and a selectable image item for operation of the in-vehicle apparatus. The input device enables a user to input spatial data to the external display unit remotely from the external display unit. The input device is configured to determine a pointed point on the window based on the inputted spatial data. The input device causes the external display unit to discriminably display information associated with the pointed point on the window. The input device is configured to receive a selection manipulation directed to the selectable image item located at the pointed point and configured to input data associated with the selection manipulation to the in-vehicle apparatus. The input device includes a manipulation member, a force generation unit, an input mode switch section, a setting section, and a force control section. The manipulation member is receivable a load from the user and is two-dimensionally movable in a movable region in response to the load. The force generation unit generates and applies a force to the manipulation member, the force depending on a position of the manipulation member. The input mode switch section switches an input mode between an absolute input mode and a relative input mode, the switching of the input mode depending on a situation of an operation target of the subject input device. The input mode switch section in the absolute input mode (i) establishes one-to-one correspondence between a coordinate of the pointed point on an operation target region of the window and a coordinate of the manipulation member in the movable region, and (ii) determines the coordinate of the pointed point on the operation target region based on the one-to-one correspondence. The input mode switch section in the relative input mode determines the pointed point on the window in a relative manner based on a two-dimensional displacement of the manipulation member with respect to a reference position in the movable region. The setting section sets the reference position for the relative input mode when the input mode section switches the input mode from the absolute input mode into the relative input mode, in such manner that the reference position is set to the position of the manipulation member in the absolute mode that is being switched into the relative input mode. The force control section controls the force generation unit in the relative input mode, in such manner that: when the manipulation member receives the load having a first property that causes the manipulation member to move beyond a predetermined manipulation permitted range, the force generation unit generates the force having a first property corresponding to the load having the first property to prohibit the manipulation member from moving beyond the predetermined manipulation, permitted range. The predetermined manipulation permitted range depends on an arrangement of the selectable image item in the relative input mode, the selectable image item in the relative input mode being a selection target item in the relative input mode.

According to the above input device, since the input mode can be switched between the absolute input mode and the relative input mode depending on the situation of the operation target of the subject input device, the input device can provide operations manner suited to situations and can reduce an effort and a time required to move, for example, a cursor. Further, since the reference position for the relative input mode is set to the position of the manipulation member in the absolute mode that is being switched into the relative input mode, a user can start inputting spatial data from the reference position immediately after the switching into the relative input mode. It is therefore possible to eliminate such an operation as moving a cursor from one selectable image item to another selectable image item, and minimize discomfort feeling due to the switching of the input mode. Further, in the relative move, the force generation unit can generate the force having the first property when, for example, a user attempts to move the manipulation member beyond the manipulation permitted range. Thereby, the input device enables a user to receive tactile feeling to perceive the manipulation permitted range. It is therefore possible to minimize discomfort feeling caused by the switching of the input mode, and it is possible to provide intuitive operational feeling to a user.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EXEMPLARY EMBODIMENTS

Exemplary embodiments are described below with reference to the accompany drawings.

(Configuration of Input Device)

Figure 1:
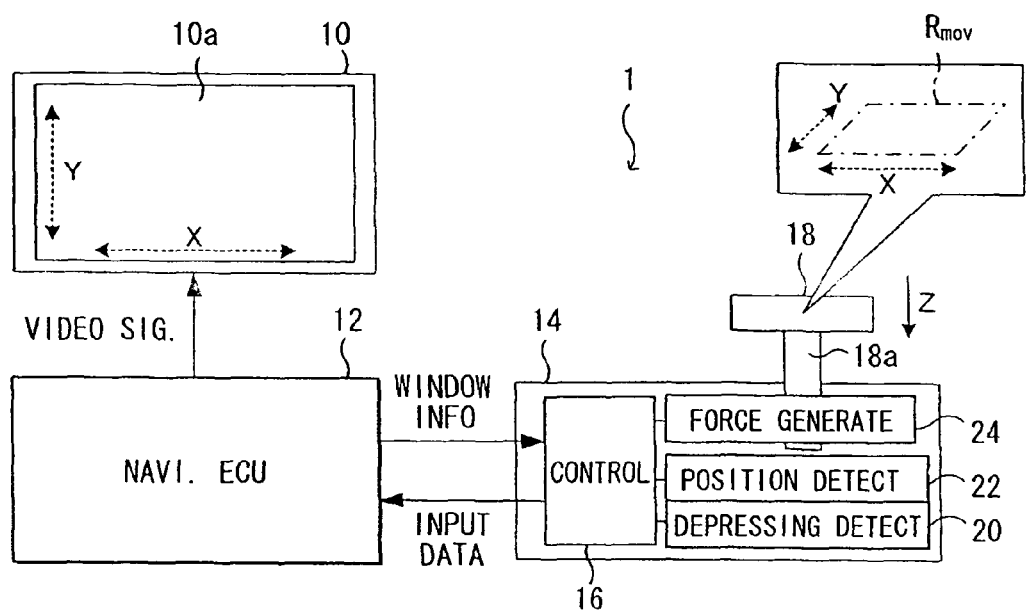
FIG. 1 is a block diagram illustrating an input device according to an exemplary embodiment.

FIG. 1 is a block diagram illustrating an input device 1 according to one embodiment. The input device 1 includes: a display unit 10 having a display screen 10a (e.g., liquid crystal display (LCD) screen) for displaying an image; and a manipulation unit for receiving user manipulation. Alternatively, the display unit 10 may be an external component of the input device 1. The input device 1 can be used for operating an in-vehicle apparatus mounted in a vehicle. In one embodiment, the in-vehicle apparatus, which is an operation target, is assumed to be a navigation apparatus having a navigation electronic control unit (ECU) 12.

Figure 2:
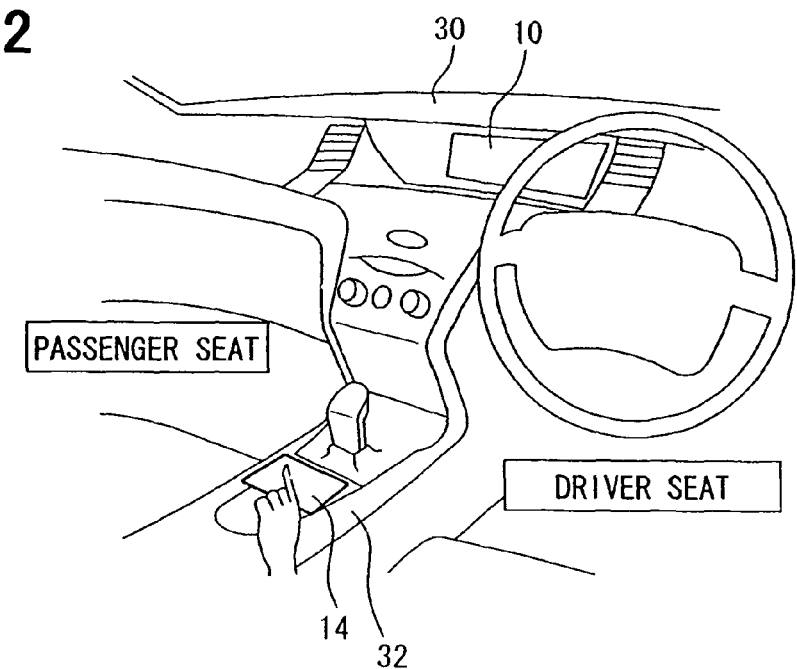
FIG. 2 is a diagram illustrating an exemplary arrangement of a display unit and a manipulation unit in a vehicle compartment.

As shown in FIG. 2, the display unit 10 is arranged on a dashboard in a vehicle compartment and positioned at a middle region of the dashboard between a driver's seat and a front passenger's seat, so that movement of driver's viewpoint is minimized when the driver takes a look at the display unit 10. The manipulation unit 14 is arranged on an upper surface of a center console 32, which is adjacent and lateral to the driver's seat, so that a user can easily manipulate the manipulation unit 14 without extending his or her arm and without changing his or her position.

The manipulation unit 14 includes a manipulation knob 18, which is manipulatable by a user (e.g., a driver of a vehicle). The manipulation knob 18 has an axis part 18a, and is movable generally along a two-dimensional plane perpendicular to the axis part 18a. In FIG. 1, a movable range $R_{mov}$ of the manipulation knob 18 is illustrated by dashed-dotted line. In one embodiment, the display screen 10a has a rectangular shape. Also, a movable region of the manipulation knob 18 in the two-dimensional plane has a rectangular shape whose aspect ratio is generally equal to that of the display screen. As shown in FIG. 1, an "X" axis direction on the two-dimensional plane in the movable region is defined as one manipulation direction of the manipulation knob 18 that corresponds to a horizontal direction of the display screen 10a. Further, a Y axis direction on the two-dimensional plane in the movable region is defined as another manipulation direction of the manipulation knob 18 that corresponds to a vertical direction of the display screen 10a. The manipulation knob 18 is also movable along a lower direction of the axis part 18a, the lower direction illustratively corresponding to an arrow Z in FIG. 1. When a user stops applying a load $F_z$ in the Z direction to the manipulation knob 18, the manipulation knob 18 returns to a home position by moving upward.

The manipulation unit 14 further includes a controller 16, a depressing manipulation sensor 20, a position detection sensor 22, and a force generation part 24. The controller 16 controls generally whole operation of the manipulation unit 14. The depressing manipulation sensor 20 senses an event of depressing the manipulation knob 18 in the Z axis direction. The position detection sensor 22 senses a coordinate of the manipulation knob 18 on an X-Y plane. The force generation part 24 supports the axis part 18a of the manipulation knob 18. When a user applies a load to the manipulation knob 18 along the X-Y plane for instance, the force generation part 24 can apply a resistance force (e.g., an opposite force) to the manipulation knob 18 such that, for example, a direction of the resistance force is opposite to that of the load. Further, the force generation part 24 can apply a drive force to the manipulation knob 18 so that the manipulation knob 18 moves in the X-Y plane.

(Operation of Input Device)

The display unit 10 displays a window as a Graphical User Interface (GUI) on the display screen 10a. The window can contain variety of information items, such as icon. A user can select an icon by manipulating the manipulation unit 14, thereby to allow the Navigation ECU to activate a function associated with the selected icon.

The controller 16 performs a procedure to enable a user to perform variety of operations on the window through user manipulation of the manipulation unit 14. Explanation is given below on an outline of the procedure. Exemplary contents of the procedure will be described later.

The input device 1 of the present embodiment has two input modes for enabling a user to operate on the window: an absolute input mode and a relative input mode. In the absolute input mode, a coordinate of the manipulation knob 18 on the X-Y plane in the movable region corresponds one-to-one to a coordinate on an operation target region of the window. In other words, the position of the manipulation knob 18 determines a pointed point on the window. In one embodiment, the operation target region is assumed to be whole region of the display screen 10a of the display unit 10. In the relative input mode, the pointed point on the window is determined in a relative manner such that the pointed point is specified based on a displacement of the manipulation knob 18 with respect to a predetermined reference position of the manipulation knob 18 in the X-Y plane.

The navigation ECU 12 inputs information for display of the window. Thus, various situations can arise on the window. In accordance with a situation on the window, the controller 16 makes a determination of whether the manipulation unit 14 should receive user manipulation in the absolute input mode or the relative input mode. The controller 16 switches the input mode in accordance with a result of the above determination.

In the absolute input mode, the controller 16 recognizes the whole region of the window as an operation target region, and establishes one-to-one correspondence between a coordinate on the whole region of the window and that of the manipulation knob 18 on the X-Y plane in the movable region. To the navigation ECU 12, the controller 16 outputs manipulation data indicative of the coordinate of the manipulation knob 18 in the movable region. Accordingly, on the window, a cursor having an arrow shape is moved to a position that corresponds to the coordinate of the manipulation knob 18. Through the above manners, when the user move the manipulation knob 18 to a certain position in the movable region, a user can causes the cursor on the window to move to a corresponding position on the operation target region. Regarding the position of the manipulation knob 18 on the X-Y plane in the absolute input mode, the manipulation knob 18 does not return to a home position when the manipulation knob 18 does not receive the load. In other words, when the user stops applying the load to the manipulation knob 18, the manipulation knob 18 stays at a position at which the user stops applying the load.

In the relative input mode, the controller 16 sets the reference position to a certain position of the manipulation knob 18 in the movable region on the X-Y plane. Based on the present position of the manipulation knob 18 and the reference position, the controller 16 acquires relative input data indicative of a displacement direction and a displacement amount of manipulation knob 18 relative to the reference position. The displacement amount of manipulation knob 18 relative to the reference position is also referred to herein as a stroke S. Further, the stroke S in the X direction and Y direction are expressed as Sx and Sy, respectively. The controller 16 enables a user to select an icon whose relative position on the window corresponds to the relative input data, or the controller 16 causes the cursor to move to a position that corresponds to the relative input data. Through the above manners, by displacing the manipulation knob 18 relative to the reference position, a user can directly select an icon whose relative position corresponds to the displacement direction and the stroke of the manipulation knob 18, or the user can move the cursor in a direction corresponding to the displacement direction on the window. Regarding the position of the manipulation knob 18 on the X-Y axes plane in the relative input mode, the manipulation knob 18 returns to the reference position when the load is not applied to the manipulation knob 18 by, for example, the user. More specifically, when the user stops applying the load to the manipulation knob 18, the controller 16 controls the force generation unit 24 so that the force generation unit 24 applies the drive force to the manipulation knob 18, so that the manipulation knob 18 returns to the reference position.

Further, in the relative input mode, user operation on the window is permitted within a predetermined region and a predetermined direction, which are referred hereinafter as an operation permitted range. The operation permitted range may be prescribed on the basis of an arrangement of selectable image items (e.g., icons) on the window. Further, the operation permitted range may be changeable depending on the arrangement of items on the window. A manipulation range of the manipulation knob 18 that corresponds to the operation permitted range on the window is also referred hereinafter as a manipulation permitted range. When the load in a prohibited direction according to the operation permitted range is applied to the manipulation knob 18, the controller 16 causes the force generation unit 24 to apply a resistance force that corresponds to the load to the axis part 18a to prevent the manipulation knob 18 from moving beyond the manipulation permitted range. Through the above manners, a user can perceive the manipulation permitted range by receiving tactile feeling.

In both of the absolute input mode and the relative input mode, when the manipulation knob 18 is depressed along the Z axis direction, the controller 16 determines that an input instruction directed to a present pointed point on the window is made. The pressing of the manipulation knob 18 in the Z axis direction is also referred to herein as a determination manipulation or a selection manipulation.

(Explanation on Input Mode Switching Procedure)

Figure 3:
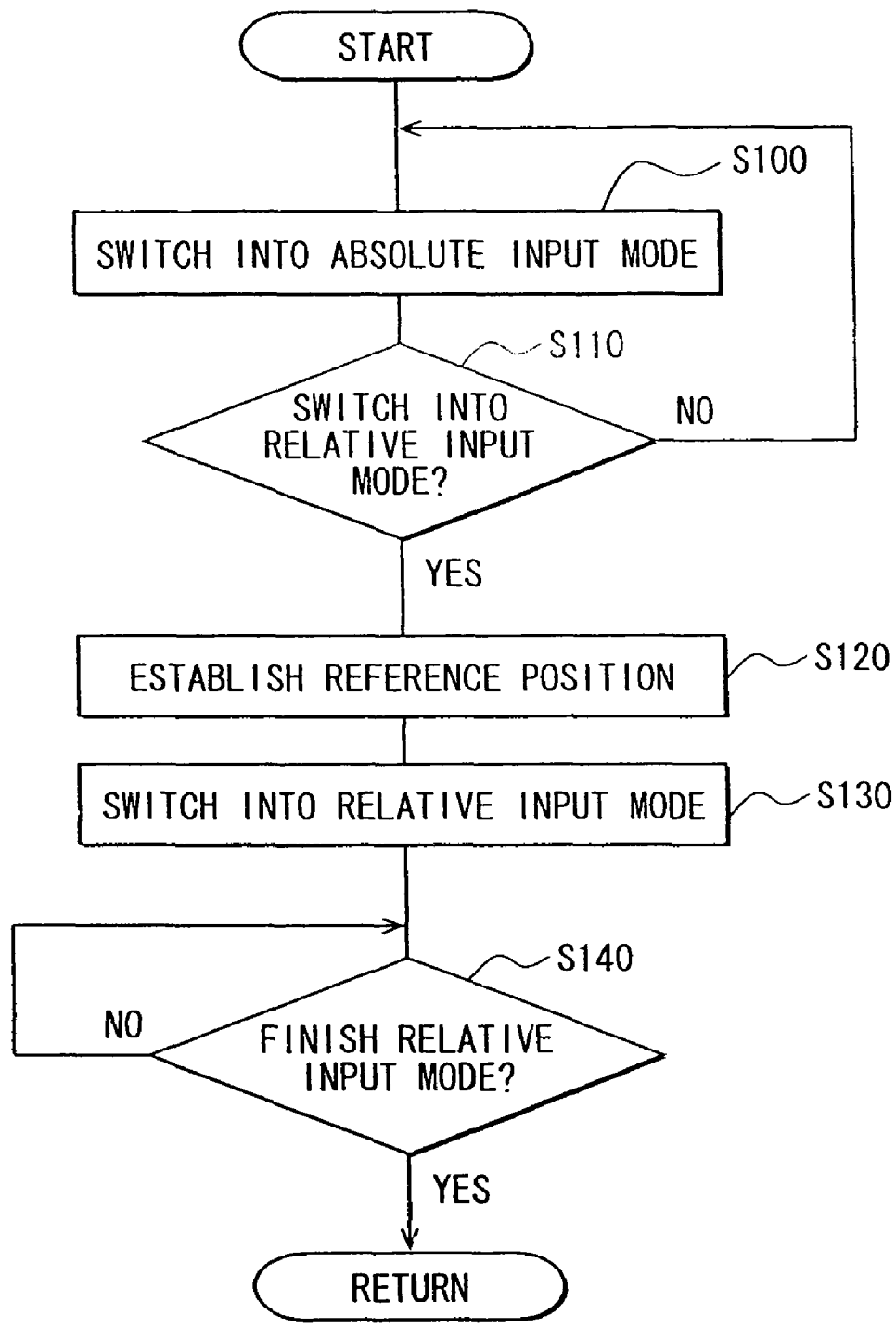
FIG. 3 is a flowchart illustrating an input mode switching procedure.

Referring to FIG. 3, explanation is given below on an input mode switching procedure, which the controller 16 of the manipulation unit 14 executes to switch the input mode between the absolute input mode and the relative input mode.

At S100, the controller 16 receives information about user manipulation in the absolute input mode. In other words, the input mode is set to the absolute input mode. At S110, the controller 16 determines whether the input mode should be switched from the absolute input mode into the relative input mode, based on a situation of the window. The situation of the window may be controlled based on information inputted from the navigation ECU 12, and can have a variety of types. The situations can be a basis of a condition for switching the input mode from the absolute input mode to the relative input mode. Exemplary cases of the situations will be described later.

When it is determined that the input mode should not be switched into the relative input mode, corresponding to "NO" at S110, the processing returns to S100 to maintain the input mode at the absolute input mode. When it is determined that the input mode should be switched into the relative input mode, corresponding to "YES at S110, the processing proceeds to S120. At S120, the present coordinate of the manipulation knob 18 in the absolute input mode is set to that of the reference position for the subsequent relative input mode. At S130, the controller 16 starts the relative input mode in which the coordinate of the reference position is one specified at S120. In setting the reference position for the relative input mode at 120, the controller 16 may forcibly adjust the reference position depending on the position of the manipulation knob 18. Explanation on such forcible adjustment will be given later.

At S140, the controller 16 determines whether the relative input mode should be ended, based on a situation on the window. When it is determined that the relative input mode should not be ended, corresponding to "NO" at S140, the controller 16 maintains the input mode at the relative input mode. When it is determined that the relative input mode should be ended, corresponding to "YES" at S140, the processing returns to S100 to switch the input mode into the absolute input mode.

Explanation is given below on exemplary cases of switching the input mode from the absolute input mode into the relative input mode.

(First Exemplary Case)

Figure 4A:
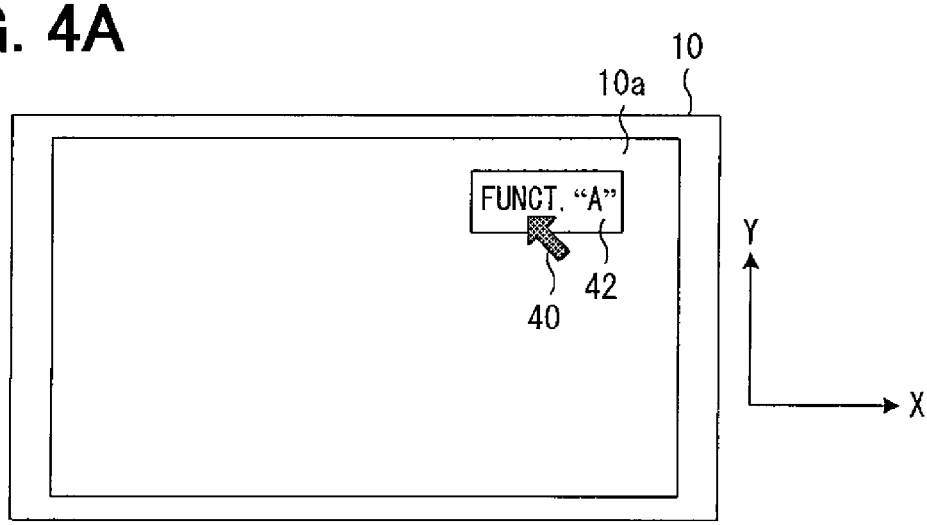
FIGS. 4A to 4D are diagrams associated with a first exemplary case of switching an input mode from an absolute input mode into a relative input mode.
Figure 4B:
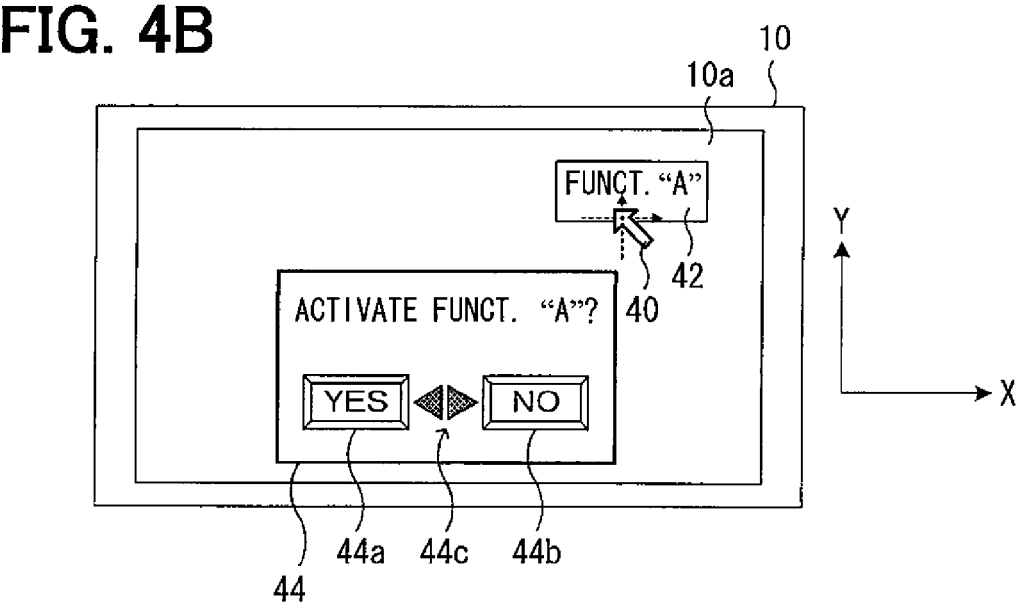

FIGS. 4A to 4D are diagrams associated with a first exemplary case of the switching of the input mode from the absolute input mode into the relative input mode. FIG. 4A is a diagram illustrating the window for the absolute input mode. FIG. 4B is a diagram illustrating a pop-up window for the relative input mode. As shown in FIGS. 4A and 4B, when a selection manipulation directed to a certain icon on the window is performed in the absolute input mode, a pop-up window is newly displayed on the window for the absolute input mode. In response to the displaying of the pop-up window, the controller 16 switches the input mode into the relative input mode to accept operation of icons on the pop-up window in the relative input mode.

FIG. 4A shows a situation where the display unit 10 displays an icon 42 for activating a function "A" on the display screen 10a, as the window for the absolute input mode. In the above window, a cursor 40 having an arrow shape is operated in the absolute input mode. More specifically, the position of the manipulation knob 18 in the movable region corresponds one-to-one to the position of the cursor 40 on the window. When a user moves the manipulation knob 18 to a certain position in the movable region, the cursor 40 on the window accordingly moves to a corresponding position in the operation target region.

As shown in FIGS. 4A and 4B, when the cursor 40 is moved onto the icon 42 on the window, and when the selection manipulation directed to the icon 42 is performed, a pop-pup window 44 is newly displayed on the window to ask a user whether the function "A" is to be activated. The pop-up window 44 contains a "YES" icon 44a for activating the function "A" and a "NO" icon 44b for deactivating the function "A".

Upon displaying the pop-up window 44, the controller 16 switches the input mode from the absolute mode into the relative input mode. In the above switching, the reference position in the relative input mode is set to a position of the manipulation knob 18 at which the selection manipulation directed to the icon 42 is performed in the absolute input mode. Then, the controller 16 highlights the cursor 40 and fixes the cursor at the position corresponding to reference position during the relative input mode is executed, even when the manipulation knob 18 is moved. In the relative input mode, when the load applied to the manipulation knob 18 is absent, the manipulation knob 18 is returned to the reference position due to the drive force applied by the force generation unit 24. It should be noted that, in the relative input mode of the below-described exemplary cases, the manipulation knob 18 is also returned to the reference position when a user stops applying the load to the manipulation knob 18.

The icons 44a and 44b are illustratively arranged at a right part and a left part of the pop-up window 44. In the relative input mode for the pop-up window 44, the manipulation permitted range of the manipulation knob 18 extends in only the X axis direction (which illustratively corresponds to left-to right direction in FIG. 4B), and the reference position of the manipulation knob 18 is set to the center of the manipulation permitted range. The pop-up window 44 further contains an icon 44c located between the icons 44a and 44b so that the icon 44c informs a user of a manipulatable direction. When the manipulation knob 18 is not receiving the load, or in other words, when the manipulation knob 18 is positioned at the reference position in the movable region, the pointed point on the pop-up window 44 is between the icons 44a and 44b due to the arrangement of the icons 44a and 44b. When the manipulation knob 18 is moved leftward by a predetermined displacement relative to the reference position, the icon 44a indicative of "YES" is pointed. When the manipulation knob 18 is moved rightward by a predetermined displacement relative to the reference position, the icon 44b indicative of "NO" is pointed.

Figure 4C:
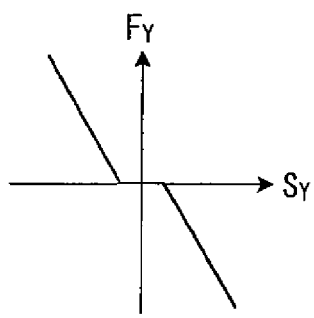
Figure 4D:
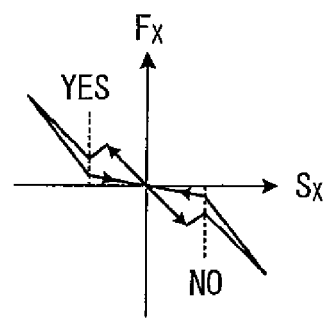

When a user displaces the manipulation knob 18 by a stroke Sx in the X axis direction, the force generation unit 24 applies the resistance force Fx the manipulation knob 18 in the X direction to, such that the resistance force Fx increases with increasing stroke Sx, and becomes minimum at the stroke at which the icon existing in the manipulation direction is pointed, as shown by a resistance force pattern in FIG. 4D. Thereby, it is possible to provide click feeling to a user. When a user further moves the manipulation knob 18 beyond the stroke that corresponds to the location of the icon, the resistance force Fx again increases with increasing stroke Sx, thereby preventing further movement of the manipulation knob 18. The above resistance force pattern is determined based on resistance force pattern data stored in, for example, a memory of the input device 1. It should be noted that the below-described resistance force patterns are also determined based on the resistance force pattern data.

When the load in the Y direction (which illustratively corresponds to vertical direction in FIG. 4B) is applied to the manipulation knob 18, in other words, when a user displaces the manipulation knob 18 by a stroke Sy in the Y axis direction, the force generation unit 24 generates the resistance force Fy corresponding to the applied load and applies the resistance force to the axis part 18a of the manipulation knob 18 to prevent the manipulation knob 18 from displacing along the Y-direction, as shown in FIG. 4C. For example, the resistance force Fy applied to the axis part 18a has such a resistance force pattern shown in FIG. 4C. More specifically, the resistance force Fy increases with increasing stroke Sy in the Y axis direction, or in other words with increasing displacement of the manipulation knob 18 along the Y axis direction. In the above resistance force pattern for the Y axis direction, the resistance force pattern may have a dead zone around the reference position. In the dead zone, no resistance force is generated. Thus, the manipulation knob 18 may be freely movable along the Y direction around the reference position.

(Second Exemplary Case)

FIGS. 5A to 5D are diagram associated with a second exemplary case of the switching of the input mode from the absolute input mode into the relative input mode. In the second exemplary case, the input mode is switched into the relative input mode when the selection manipulation directed to a predetermined icon is performed in the absolute input mode, and when the window is accordingly switched into a menu display where a selection manipulation is possible in the relative input mode.

Figure 5A:
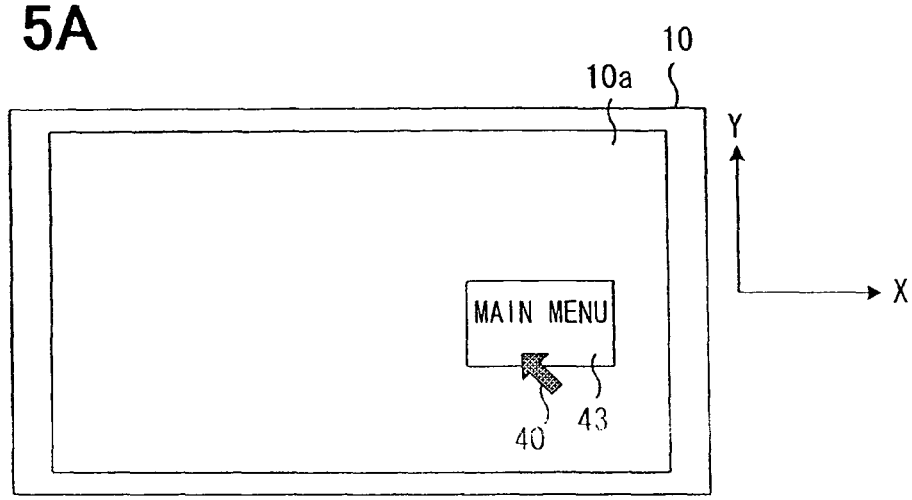
FIGS. 5A to 5D are diagrams associated with a second exemplary case of switching the input mode from the absolute input mode into the relative input mode.

FIG. 5A is a diagram illustrating an initial display of the window on the display screen 10a of the display unit 10. The initial display can be used in the absolute input mode and contains a "main menu" icon 43 associated with an instruction for switching the window from the initial display into the main menu display. On the initial display, the cursor 40 is operated in the absolute input mode. More specifically, the position of the manipulation knob 18 in the movable range corresponds one-to-one to the position of the cursor 40 on the initial display of the window. When a user moves the manipulation knob 18 to a certain position in the movable range, the cursor 40 on the window accordingly moves to a corresponding position within the operation target region.

Figure 5B:
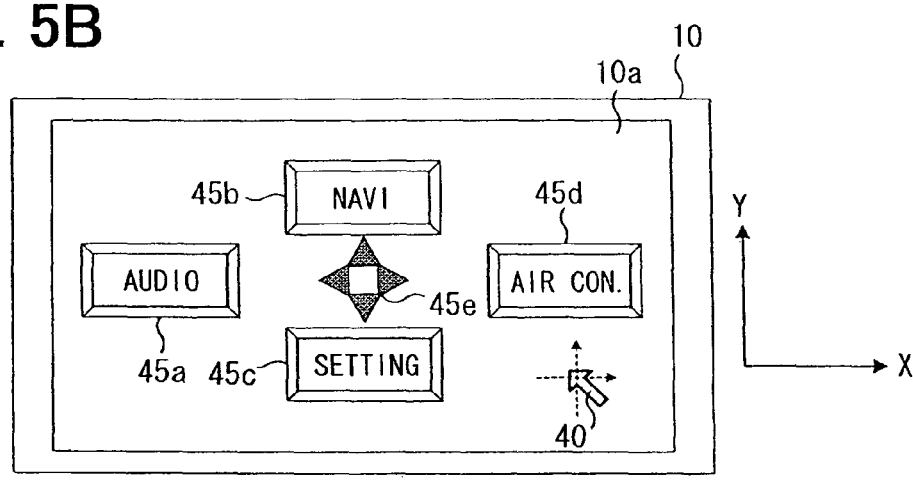

FIG. 5B is a diagram illustrating a menu display of the window. The menu display can be used in the relative input mode. As illustrated in FIGS. 5A and 5B, when the cursor 40 is moved onto the icon 43 on the initial display, and when the selection manipulation directed to the icon 43 is performed, the window is switched into the menu display "A". The menu screen "A" contains an "audio" icon 45a for operation of an audio system, a "navi" icon 45b for operation of a navigation system, a "setting" icon 45c for setting operation and an "air-con" icon 45d for operation of air-conditioner system. The icons 45a to 45d are arranged so as to from a cross shape and are respectively located at an upper part, a lower part, a left part and a right part of the menu display.

When the window is switched into the menu display "A", the controller 16 switches the input mode from the absolute input mode into the relative input mode. In the above switching, the reference position for the relative input mode is set to the position of the manipulation knob 18 at which the selection manipulation directed to the icon 43 is performed. Further, the cursor 40 is highlighted. During the relative input mode, the reference position of the manipulation knob 18 and the corresponding position on the window are fixed even if the position of the manipulation knob 18 is changed.

In the menu display "A", the four icons 45a to 45d are arranged so as to form a cross-shape. In the relative input mode for the menu display "A", the manipulation permitted range of the manipulation knob 18 extends in the X axis direction and the Y axis direction, which correspond to a horizontal direction and a vertical direction of the display screen 10a, as shown in FIG. 5B. The reference position is set to the center of the manipulation permitted range. The menu display further contains an item 45e having an arrow shape for informing a user of manipulatable directions in the relative input mode. The item 45e is displayed at a central region of the cross shape formed by the four icons 45a to 45d.

When the manipulation knob 18 is not receiving the load, and when the manipulation knob 18 is positioned at the reference position, the central region of the cross shape on the operation window is pointed in accordance with the arrangement of the four icons 45a to 45d. When the manipulation knob 18 is moved leftward by a predetermined displacement relative to the reference position, the "audio" icon 45a is pointed. When the manipulation knob 18 is moved rightward by a predetermined displacement relative to the reference position, the "air-con" icon 45d is pointed. When the manipulation knob 18 is moved upward by a predetermined displacement relative to the reference position, the "navi" icon 45b is pointed. When the manipulation knob 18 is moved frontward by a predetermined displacement relative to the reference position, the "setting" icon 45c is pointed.

Figure 5C:
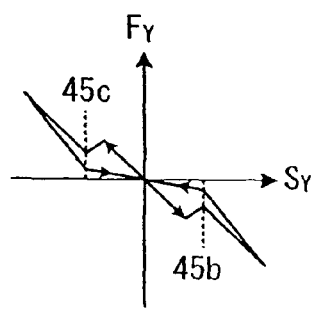
Figure 5D:
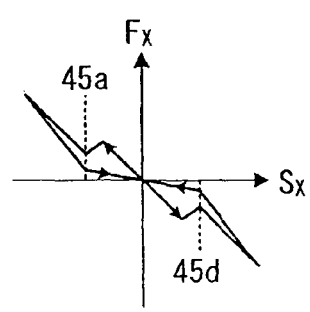

When a user moves the manipulation knob 18 along the X axis direction or the Y axis direction in order to point the corresponding icon, the force generation unit 24 generates a resistance force having a resistance force pattern to provide click feeling to a user, as shown in FIGS. 5C and 5D. More specifically, the resistance forces Fx and Fy respectively increase with increasing strokes Sx in the X axis direction and Sy in the Y axis direction, and the resistance force Fx, Fy becomes minimum at the position where the corresponding icon is pointed. When a user further moves the manipulation knob 18 beyond the stroke that corresponds to the location of the icon, the resistance force again increases with increasing stroke, thereby preventing further movement of the manipulation knob 18.

(Third Exemplary Case)

FIGS. 6A to 6F are diagrams associated with a third exemplary case of the switching of the input mode from the absolute input mode into the relative input mode. The third exemplary case is similar to the second exemplary case in that the input mode is switched into the relative input mode when the window is switched into the menu display. Thus, between the second and third exemplary cases, it is possible to employ a similar manner of the switching of the window from the initial display for the absolute mode into the menu display for the relative input mode. A difference between the second and third exemplary cases is, for example, an arrangement of the menu display.

Figure 6A:
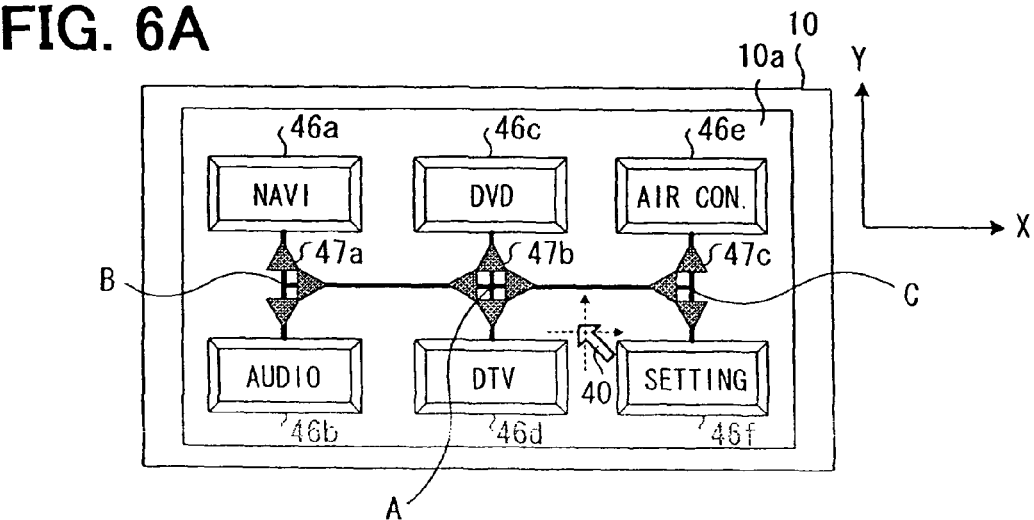
FIGS. 6A to 6F are diagrams associated with a third exemplary case of switching the input mode from the absolute input mode into the relative input mode.

FIG. 6A illustrates a menu display "B" for the relative input mode. The menu display "B" is displayed after the switching of the winnow from the initial display. The menu display "B" contains: a "navi" icon 46a for operation of a navigation system; an "audio" icon" 46b for operation of an audio system; a "DVD" icon 46c for operation associated with watching a DVD; a "DTV" icon 46d for operation associated with watching a digital terrestrial television (DTV); an "air-con" icon 46d for operation of an air-conditioner system; and a "setting" icon 46e for various settings. The icons 46a to 47e are arranged in an array of two rows and three columns.

Upon switching the window into the menu display "B", the controller 16 switches the input mode from the absolute input mode into the relative input mode. In the above switching, the reference position for the relative input mode is set to the position at which the selection manipulation for switching the window is performed in the absolute input mode. Further, the cursor 40 is highlighted. The reference position is fixed during the relative input mode even if the manipulation knob 18 is moved.

In the menu screen "B", the six icons 46a to 46f are arranged in an array of two rows and three columns. In the relative input mode for the menu screen "B", when the manipulation knob 18 is not receiving the load, or in other words, when the manipulation knob 18 is located at the reference position, an middle point "A" between the icons 46c and 46d is pointed (see FIG. 6A). The middle point "A" may be located at a center of the window. When the manipulation knob 18 is moved leftward by a predetermined distance from the reference position, a middle point "B" between the icons 46a and 46b is pointed (see FIG. 6A). When the manipulation knob 18 is moved rightward by a predetermined distance from the reference position, a middle point "C" between the icons 46e and 46f is pointed (see FIG. 6A).

Manipulation permitted ranges of the manipulation knob 18 around the middle points "A", "B", "C" are different from each other. When the pointed point is around the middle point "A", the manipulation knob 18 can be manipulated in a first manipulation permitted range, which extends along the X and Y axes and has the center at a point corresponding to the reference position. When the pointed point is around the middle point "B", the manipulation knob 18 can be manipulated in a second manipulation permitted range, which extends along the X and Y axes has the center at a point corresponding to the middle point B. When the pointed point is around the middle point C, the manipulation knob 18 can be manipulated in a third manipulation permitted range, which extends along the X and Y axes and has the center at a position that corresponds to the middle point C. The menu display further contains arrow shaped items 47a, 47b, 47c for respectively informing a user of operable directions at the position B, A, C.

When the middle point "A" is pointed, and when the manipulation knob 18 is then moved rearward by a predetermined distance from a position corresponding to the middle point "A", the "DVD" icon 46c is pointed. When the manipulation knob 18 is moved frontward by a predetermined distance from a position corresponding to the middle point "A", the "DTV" icon 46d is pointed.

Figure 6B:
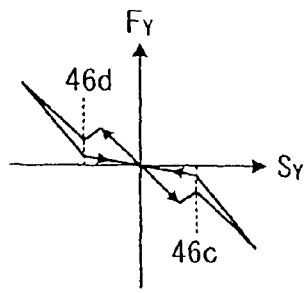

FIG. 6B is a diagram illustrating the resistance force Fy in the Y axis direction as a function of the stroke Sy in a vicinity of the middle point "A". As shown in FIG. 6B, when a user moves the manipulation knob 18 along the Y axis direction in order to point the corresponding icon, the force generation unit 18 generates a resistance force having such a resistance force pattern that the resistance force Fy increases with increasing stroke Sy, and then decreases and becomes minimum at a position at which the icon exiting in the manipulation direction is pointed, and thereby provides click feeling. When a user further moves the manipulation knob 18 beyond the stroke that corresponds to the location of the icon, the resistance force Fy again increases with increasing stroke Sy, thereby preventing further movement of the manipulation knob 18. The resistance force is not generated in response to movement of the manipulation knob 18 along the X axis from a position that corresponds to the middle point "A".

When a user moves the manipulation knob 18 rearward by a predetermined distance from a position that corresponds to the middle point "B", the "navi" icon 46a is pointed. When a user moves the manipulation knob 18 downward by a predetermined distance from a position that corresponds to the middle point "B", the "audio" icon 46b is pointed.

Figure 6C:
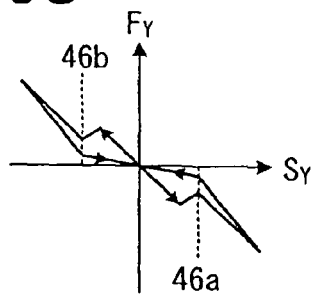
Figure 6D:
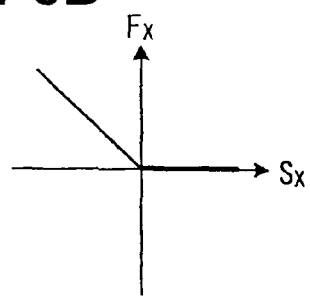

FIG. 6C is a diagram illustrating the resistance force Fy in the Y axis direction as a function of the stroke Sy in a vicinity of the middle point "B". FIG. 6D is a diagram illustrating the resistance force Fx in the x axis direction as a function of the stroke Sx in a vicinity of the middle point "B". When a user moves the manipulation knob 18 along the Y axis direction from a position corresponding to the middle point "B" in order to point the icon existing in the manipulation direction, the force generation unit 24 generates a resistance force having such a resistance force pattern that the resistance force Fy increases with increasing stroke Sy, and decreases and becomes minimum at a position that corresponds to the icon exiting in the manipulation direction, and thereby provides click feeling to a user, as shown in FIG. 6C. When a user further moves the manipulation knob 18 beyond the stroke corresponding to the location of the icon, the resistance force Fy again increases with increasing stroke Sy, thereby preventing further movement of the manipulation knob 18. As shown in FIG. 6D, when a user moves the manipulation knob 18 along the X axis direction, the force generation unit 24 generates a resistance force having such a resistance force pattern that: when a user applies the load to the manipulation knob 18 to move the manipulation knob 18 leftward from a position corresponding to the position "B", the force generation unit 24 generates the resistance force Fx that prevents the further leftward movement of the manipulation knob 18; the force generation unit 24 does not apply the resistance force to the manipulation knob 18 in response to the load for displacing the manipulation knob 18 rightward.

When a user moves the manipulation knob 18 rearward by a predetermined distance from a position that corresponds to the middle point "C", the "air-con." icon 46e is pointed. When a user moves the manipulation knob 18 frontward by a predetermined distance from a position that corresponds to the middle point "C", the "setting" icon 46f is pointed.

Figure 6E:
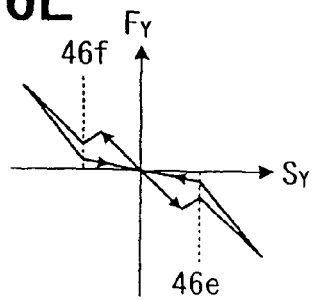
Figure 6F:
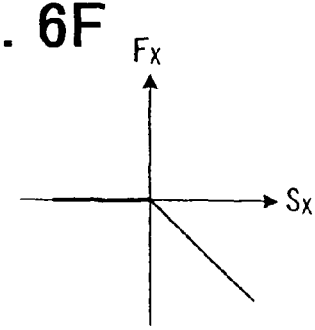

FIG. 6E is a diagram illustrating the resistance force Fy in the Y axis direction as a function of the stroke Sy in a vicinity of the middle point "C". FIG. 6F is a diagram illustrating the resistance force Fx in the x axis direction as the stroke Sx in a vicinity of the middle point "C". When the manipulation knob 18 is manipulated along the Y axis direction from a position corresponding to the middle point "C" in order to point an icon existing in the manipulation direction, the force generation unit 24 generates a resistance force having such a resistance force profile that the resistance force Fy increases with increasing stroke Sy and becomes minimum at the position where the corresponding icon is pointed, thereby providing click feeling to a user, as shown in FIG. 6E. When a user further moves the manipulation knob 18 in the Y direction beyond the stroke that corresponds to the location of the icon, the resistance force Fy again increases with increasing stroke Sy, thereby preventing further movement of the manipulation knob 18. When the manipulation knob 18 is moved along the X axis direction, the force generation unit 24 generates a resistance force Sx having such a resistance force pattern that: when a user applies the load to the manipulation knob 18 to move the manipulation knob 18 rightward from a position corresponding to the middle point "C", the force generation unit 24 generates the resistance force that prevents the rightward movement of the manipulation knob 18, as shown in FIG. 6E. In response to the load for moving the manipulation knob 18 leftward, the force generation unit 24 applies the resistance force to the manipulation knob 18

(Fourth Exemplary Case)

Figure 7A:
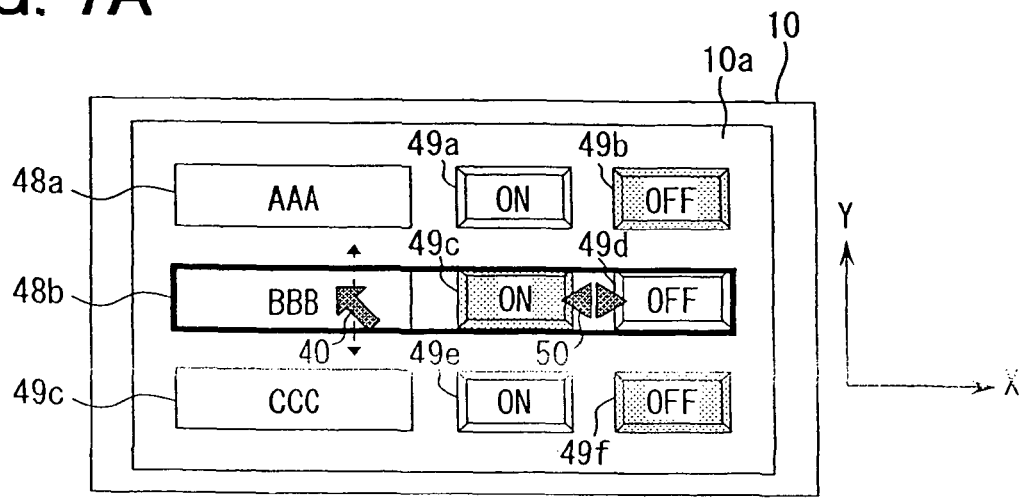
FIGS. 7A to 7C are diagrams associated with a fourth exemplary case of switching the input mode from the absolute input mode into the relative input mode.
Figure 7B:
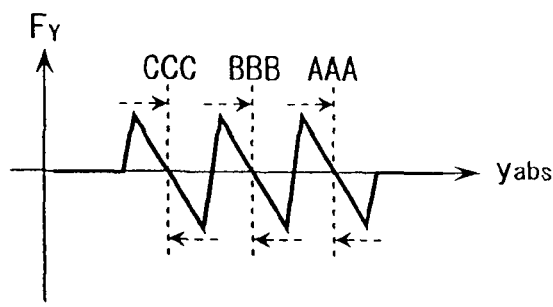
Figure 7C:
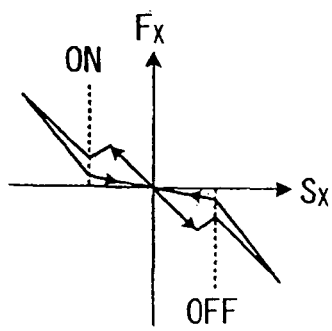

FIGS. 7A to 7C are diagrams associated with a fourth exemplary case of the switching of the input mode from the absolute input mode into the relative input mode. In the fourth exemplary case, the input mode is switched in accordance with an operation direction of the pointed point, or a manipulation direction of the manipulation knob 18. For example, the absolute input mode is applied to an operation of the pointed point along the Y axis corresponding to a rearward manipulation direction and a frontward manipulation direction, and the relative input mode is applied to the operation along the X axis direction corresponding to a leftward manipulation direction and a rightward manipulation direction.

FIG. 7A illustrates an exemplary situation where the window contains a "AAA" icon 48a, a "BBB" icon 48b and a "CCC" icon 48c, which are located on a left part of the window and are aligned along the vertical direction of the display screen 10a. The window further contains "ON" icons 49a, 49c, 49e and "OFF" icons 49b, 49d, 49f on a right part of the window. The "ON" icons 49a, 49c, 49e are used for activing functions associated with the "AAA" icon 48a, the "BBB" icon 48b and the "CCC" icon 48c, and are arranged so as to be coupled with the icons 48a, 48b, 48c, respectively. The "OFF" icons 49b, 49d, 49f are used for deactivating the functions associated with the icons 48a, 48b, 48c, and are arranged so as to be coupled with the icons 48a, 48b, 49c, respectively.

In the window shown in FIG. 7A, the absolute input mode is applied to an operation for moving the cursor 40 in the Y direction and for selecting an icon from among the "AAA" icon 48a, the "BBB" icon 48b and the "CCC" icon 48c. More specifically, the Y-axis absolute coordinate $y_{abs}$ of the manipulation knob 18 in the movable region corresponds one-to-one to the Y-axis coordinate of the cursor 40 on the window. In other words, when the Y-axis absolute coordinate $y_{abs}$ of the manipulation knob 18 is changed by user manipulation, the Y-axis coordinate of the cursor 40 on the window is accordingly changed within the operation target region.

FIG. 7B is a diagram illustrating the force Fy in the Y axis direction as a function of the absolute coordinate $Y_{abs}$ in the Y axis direction. When a user moves the manipulation knob 18 along the Y axis to move the cursor 40 in the Y direction, the force generation unit 24 generates the drive force Fy depending on the absolute Y-axis coordinate $y_{abs}$ of the manipulation knob 18, so that a direction of the drive force Fy corresponds to a direction toward the closest icon, as shown in FIG. 7B. In the above, the closest is one of the "AAA" icon 48a, the "BBB" icon 48b and the "CCC" icon depending on the pointed point. According to the above drive force pattern, it is possible to provide a user with such an operation feeling that the manipulation knob 18 is attracted to the closest icon.

When a user moves the cursor 40 in the absolute input mode and selects one of the "AAA", "BBB" and "CCC" icons, and when the user then attempts to move the manipulation knob 18 along the X direction (leftward or rightward) in order to select the "ON" or "OFF" icons coupled with the selected icon, the input mode is immediately switched into the relative input mode.

FIG. 7A shows a situation where the "BBB" icon 48b is selected using the cursor 40. In the above situation, the relative input mode is applied to leftward or rightward manipulation of the manipulation knob 18, and the "ON" icon 49c and the "OFF" icon 49d are set to selection target items. The reference position in the relative input mode is set and fixed to the position of cursor 40 at which the "BBB" icon 48b is selected. In accordance with the arrangement of the icons 49c and 49d, leftward movement of the manipulation knob 18 by a predetermined distance leads to the pointing of the "ON" icon 49c, and rightward movement of the manipulation knob 18 by a predetermined distance leads to the pointing of the "OFF" icon 49d.

FIG. 7C is a diagram illustrating the resistance force Fx in the X axis direction as a function of the stroke Sx. When a user moves the manipulation knob 18 along the X axis direction to point the "ON" icon or the "OFF" icon existing in the operation direction, the force generation unit 24 applies the resistance force Fx to the manipulation knob 18 in accordance with the stroke Sx of the manipulation knob 18 in the X axis direction, as shown in FIG. 7C. The resistance force Fx becomes minimum at the stroke corresponding to the location of the icon, and thereby providing click feeling. Against the load for further moving the manipulation knob 18 beyond the stroke corresponding to the location of the icon, the resistance force Fx increases again to prevent the further movement of the manipulation knob 18.

(Fifth Exemplary Case)

Figure 8A:
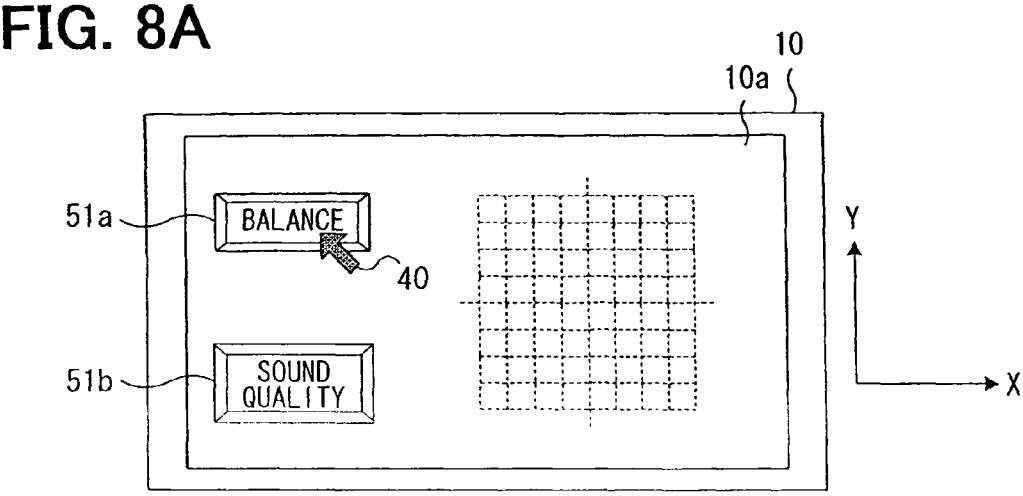
FIGS. 8A to 8C are diagrams associated with a fifth exemplary case of switching the input mode from the absolute input mode into the relative input mode.
Figure 8B:
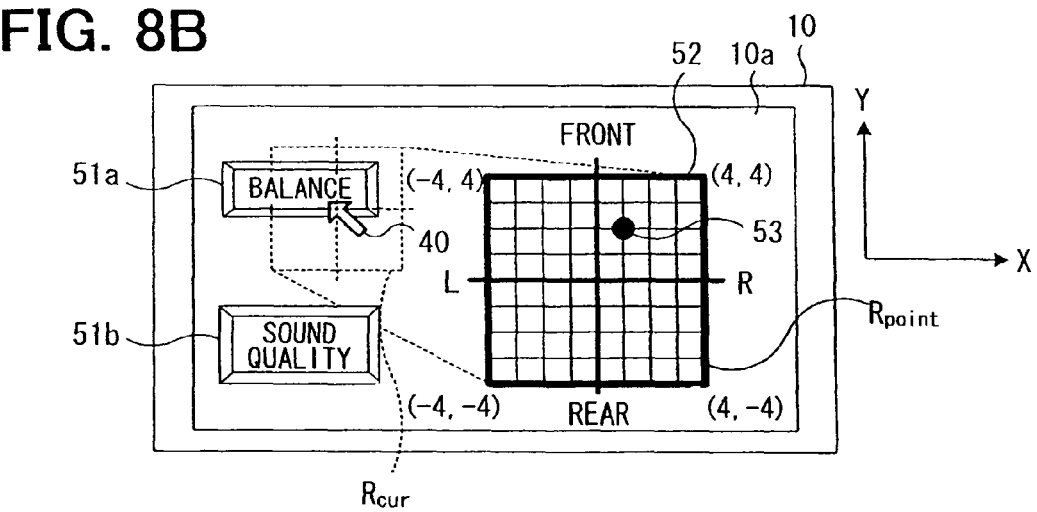
Figure 8C:
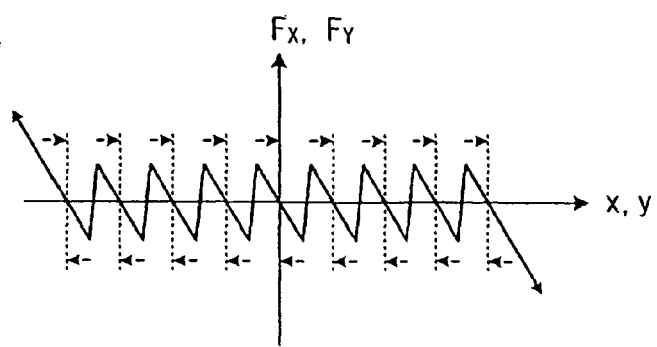

FIGS. 8A to 8C are diagrams associated with a fifth exemplary case of the switching of the input mode from the absolute input mode into the relative input mode. In the fifth exemplary case, when the selection manipulation directed to a predetermined icon on the window is performed in the absolute input mode, there emerge a new cursor and a new operation range for the relative input mode. A selection manipulation within the new operation range is to be accepted in the relative input mode.

FIG. 8A illustrates the window for the absolute input mode where a "balance" "icon" 51a and a "sound quality" 51b are displayed on the displays screen 10a of the display unit 10. The "balance" icon 51a can be used for adjusting a balance of sound volumes between left, right, front and rear speaker units. The "sound quality" icon 51b is used for adjusting quality of sound outputted from the speaker. In the above situation, the cursor 40 is operated in the absolute input mode.

More specifically, the position of the manipulation knob 18 in the movable region corresponds one-to-one to the position of the cursor 40 on the window. When a user manipulation moves the manipulation knob 18 to a certain position in the movable region, the cursor 40 on the window accordingly moves to a corresponding point.

FIG. 8B is a diagram illustrating the window which contains a balance input coordinate system 52 for the relative input mode. As shown in FIGS. 8A and 8B, when the cursor 40 is moved onto the "balance" icon 51a, and when the selection manipulation directed to the "balance" icon 51a is performed, a balance input coordinate system 52 for setting the balance of sound volume of the speaker is newly displayed on a right part of the window. The balance input coordinate system 52 has (i) an X axis indicative of a level of sound volume of the left and right speaker units and (ii) a Y axis indicative of a level of sound volume of the front and rear speaker units. By pointing a desired coordinate of the balance input coordinate system 52, it is possible to set the balance of sound volume between the front, rear, left and right speaker units.

Upon displaying the balance input coordinate system 52, the controller 16 switches the input mode from the absolute input mode into the relative input mode. In the above switching, the reference position in the relative input mode is set to the position at which the selection manipulation directed to the icon 51a is performed in the absolute input mode. Further, The cursor 40 is highlighted. During the relative input mode, the reference position of the manipulation knob 18 is fixed even if the manipulation knob 18 is moved.

A pointer 53 for indicating a coordinate of the balance input coordinate system 52 is displayed on the balance input coordinate system 52. When the manipulation knob 18 is displaced along the X-Y plane relative to the reference position, the pointer 53 is moved in accordance with a displacement direction and a displacement amount of the manipulation knob 18.

Regarding the balance input coordinate system 52 for the relative input mode, the manipulation knob 18 is manipulatable in a manipulation permitted range described as follows. A center of the manipulation permitted range predetermined range is set to the reference position. The manipulation permitted range of the manipulation knob 18 corresponds to a movable range $R_{point}$ of the pointer 50 on the window, and extends in the X axis and the Y axis, as shown in FIG. 8B as a region defined by the solid lines. When the manipulation permitted range in the relative input mode is converted into a movable range $R_{cur}$ of the cursor 40 in the absolute input mode, the converted moveable range $R_{curr}$ has a rectangular shape whose center is located at the cursor 40, as shown in FIG. 8B as an area defined by dashed lines. The movable range $R_{point}$ on the balance input coordinate system 52 is set larger than the converted movable range $R_{cur}$. Thus, displacement of the pointed point on the window in response to displacement of the manipulation knob 18 in the relative input mode becomes larger than that in the absolute input mode. Accordingly, it is possible to provide a large displacement of the pointer 53 in response to a smaller displacement of the manipulation knob 18, and it is therefore possible to reduce an operation effort and an operation time.

The balance input coordinate system 52 has the origin (0, 0) and grid points (x, y) in accordance with predetermined intervals of the grid points. The pointer 53 pointes the origin or the center of the balance input coordinate system 52 when the manipulation knob 18 is not receiving a load, or in other words, when the manipulation knob 18 is at the reference position. When the manipulation knob 18 is displaced leftward from the reference position, the pointer 53 is accordingly displaced leftward to a corresponding coordinate on the balance input coordinate system 52. When the manipulation knob 18 is displaced rightward from the reference position, the pointer 53 is moved rightward to a corresponding coordinate on the balance input coordinate system 52. When the manipulation knob 18 is displaced frontward from the reference position, the pointer 53 is accordingly displaced upward or frontward to a corresponding coordinate on the balance input coordinate system 52. When the manipulation knob 18 is displaced rearward from the reference position, the pointer 53 is accordingly moved downward or rearward to a corresponding coordinate on the balance input coordinate system 52. A combination of the above-described rightward, leftward, rearward and front ward manipulation of the manipulation knob 18 enables the movement of the pointer 53 to a desired grid point on the balance input coordinate system 52.

FIG. 8C is a diagram illustrating the drive force as a function as coordinates (x, y) of the balance input coordinate system 52. When a user moves the manipulation knob 18 along the X axis and the Y axis to move the pointer 53 on the balance input coordinate system 52, the force generation unit 24 generates the resistance force having a predetermined force pattern, as shown in FIG. 8C. The resistance force Fx, Fy depends on the X axis coordinate x and the y axis coordinate y of the pointer 53 on the balance input coordinate system 52, such that the resistance force Fx, Fy has a direction toward the closet grid point of the balance input coordinate system 52. Thereby, the resistance force provides a user with such feeling that the manipulation knob 18 is attracted toward the closest grid point of the balance input coordinate system 52. When the pointer 53 reaches a outer boundary of the movable region, and when the manipulation knob 18 is then attempted to be displaced beyond the outer boundary, the resistance force increases to prevent further movement of the manipulation knob beyond the outer boundary.

(Sixth Exemplary Case)

Figure 9A:
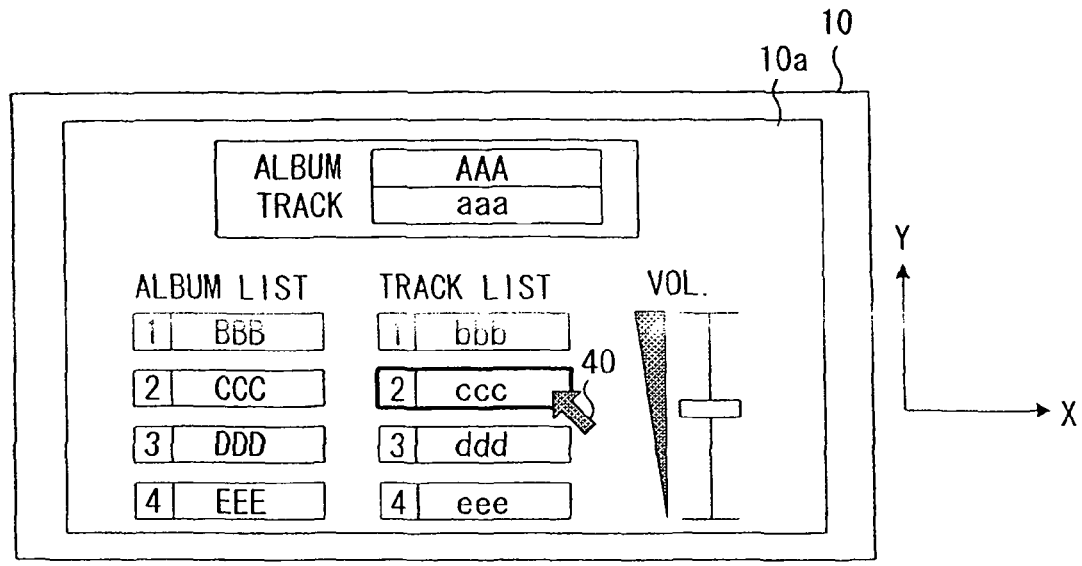
FIGS. 9A and 9B are diagrams associated with a sixth exemplary case of switching the input mode from the absolute input mode into the relative input mode.
Figure 9B:
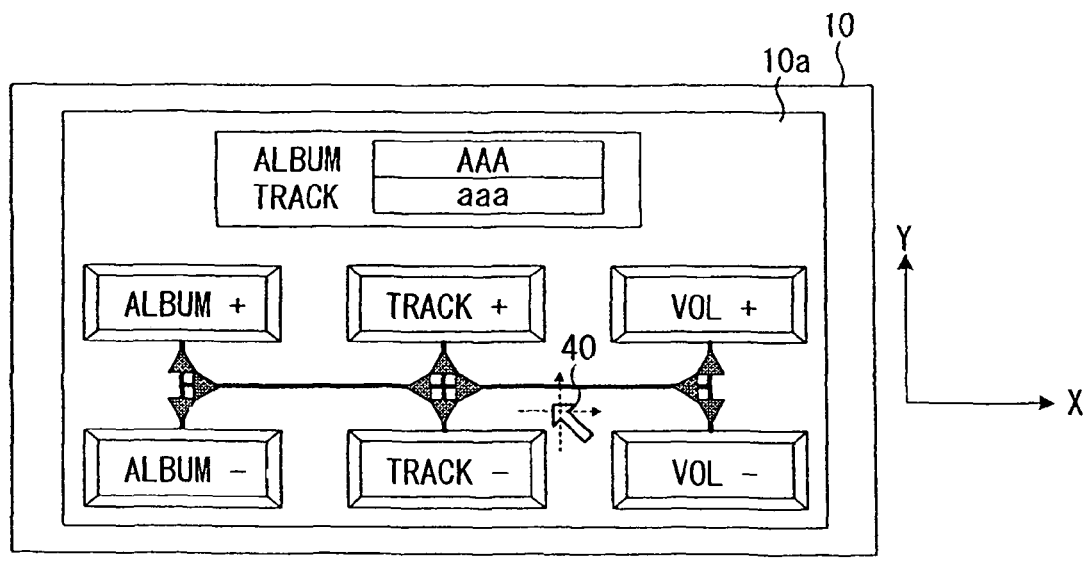

FIGS. 9A and 9B are diagrams associate with a sixth exemplary case of the switching of the input mode from the absolute input mode into the relative input mode. In the sixth exemplary case, the window for operation of the audio system is switched between the window for absolute input mode and that for the relative input mode depending on whether the vehicle is traveling or making a stop.

FIG. 9A illustrates a situation where the display unit 10 displays the window for operation of the audio system in the absolute input mode. The window for the absolute input mode is displayed when the vehicle is making a stop. As shown in FIG. 9A, the window contains: a list of albums registered with the navigation ECU 12; a list of tracks of the album that is being played, an icon for volume adjustment of sound; and the like. The window is operated in the absolute input mode. More specifically, the position of the manipulation knob 18 in the movable region corresponds one-to-one to the position of the cursor 40 on the window. When a user manipulation moves the manipulation knob 18 to a certain position in the movable region, the cursor 40 on the window accordingly moves to a corresponding position in the operation target region.

On the window shown in FIG. 9A, it is possible to move the cursor 40 onto, for example, an icon indicative of one album, and perform the selection manipulation directed to the icon. Thereby, it is possible to select the album to be played. Similarly, it is possible to move the cursor 40 onto an icon indicative of one track in the list, and it is possible to perform the selection manipulation directed to the icon. Thereby it is possible to select the track to be played from among the tracks in the selected album. Further, it is possible to move the cursor 40 onto a volume bar, and it is possible to perform a drag operation of the volume bar. Thereby, it is possible to adjust sound volume. In the drag operation, the cursor 40 may be operated upward or downward, while the manipulation knob 18 is being depressed so that the selection manipulation directed to the volume bar is maintained.

FIG. 9B is a diagram illustrating the window for operation of the audio system in the relative input mode. The window for the relative input mode is displayed when the vehicle is traveling. The window for the relative input mode contains an "album+" icon, an "album−" icon, a "track+" icon, a "track−" icon, a "VOL+" icon and a "VOL−" icon, which are arranged in an array of two rows and three columns. The "album+" icon and the "album−" icon can be used for selecting an album for playback in ascending order and descending order, respectively. The "track+" icon and the "track−" icon can be used for selecting a track for playback in ascending order and descending order, respectively. The "VOL+" icon and the "VOL−" icon can be used for increasing and decreasing sound volume, respectively.

When a vehicle starts traveling after making a stop, the window is switched from the window for the absolute input mode into that for the relative input mode, as shown in FIGS. 9A and 9B. In response to the switching of the window, the input mode is switched from the absolute input mode into the relative input mode. The reference position in the relative input mode is set to the position of the manipulation knob 18 at which the window is switched. The cursor 40 is highlighted accordingly. During the relative input mode, the reference position of the manipulation knob 18 are fixed even if the position of the manipulation knob 18 is moved.

Since the icons serving as the operation target items are arranged in the array of two rows and three columns, manners of pointing the icons and generating a resistance force case can be generally between the present exemplary case and the third exemplary case (cf. FIGS. 6A to 6F).

(Adjustment of Reference Position)

In each of the first to six exemplary cases, when the input mode is switched from the absolute input mode into the relative input mode, the reference position in the relative mode is set to the position of the manipulation knob 18 at which the input mode is switched. However, if the pointed point on window is located around an outer boundary of the window at a time of switching the input, a difficult may arise. The difficulty is that it becomes difficult to ensure a movable region of the manipulation knob 18 required in the relative input mode.

In view of the above difficulty, the reference position may be adjusted in the following ways.

Figure 10A:
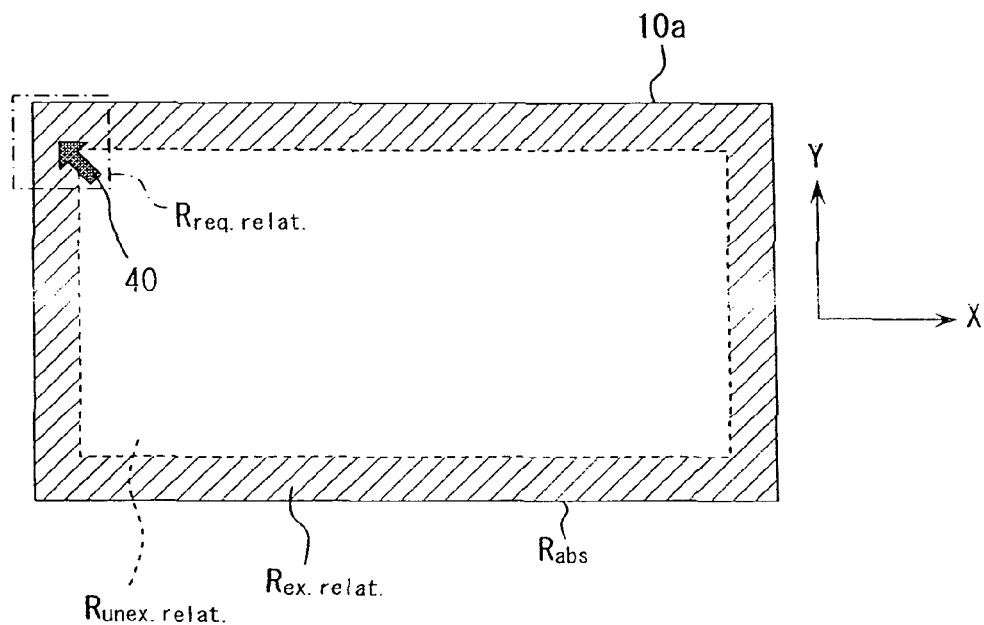
FIGS. 10A and 10B are diagrams associated with an exemplary case of adjustment of a reference position for the relative input mode.
Figure 10B:
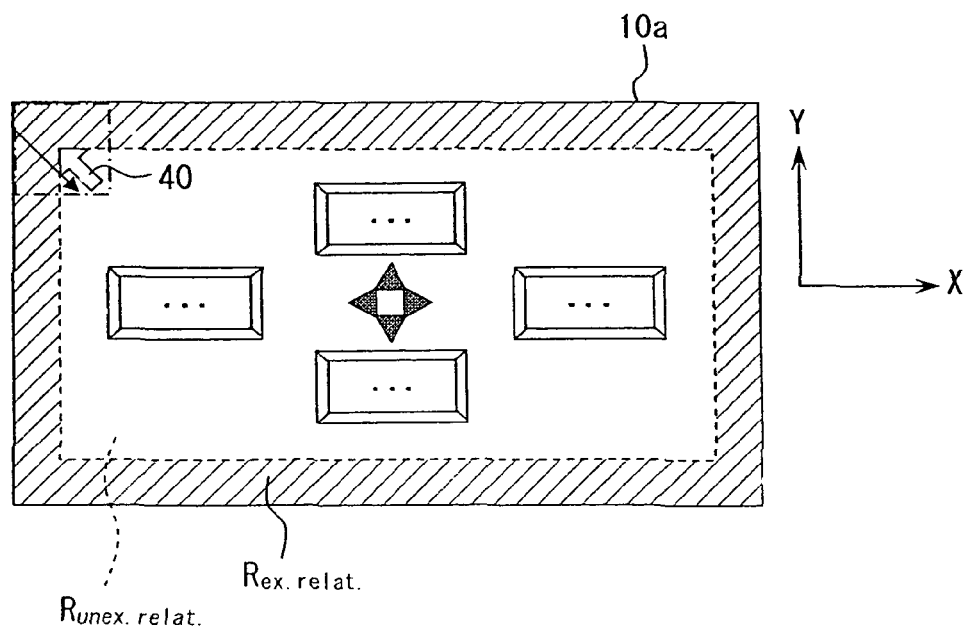

FIG. 10A illustrates a situation where the cursor 40 is located at a point around an upper-left end of the window in the absolute input mode. In FIG. 10, the window defines the manipulation permitted range $R_{abs}$ for the absolute input mode. When it is assumed that the reference position is set as corresponding to the point around the upper-left end of the window, the manipulation permitted range $R_{req.relat.}$ required in the relative input mode becomes an area $R_{req.relat}$ illustrated in FIGS. 10A and 10B by a dished-dot line. In the above situation, since the position of the manipulation knob 18 corresponds to a part around the upper-left end of the window, the manipulation knob 18 can not sufficiently move in a leftward movement direction and an upper movement direction. In other words, the movable region of the manipulation knob 18 required in the relative input mode is not ensured in the leftward and upper movement directions. More specifically, the window has a predetermined exclusion part $R_{ex.\ relat.}$, which is located along an outer boundary of the window and is illustrated as a shaded area in FIGS. 10A and 10B. Further, the window further has a predetermined un-exclusion part $R_{unex.\ relat.}$ surrounded by the predetermined exclusion part $R_{ex.\ relat.}$. If the cursor 40 is located within the predetermined exclusion part $R_{ex.\ relat.}$ at a time when the input mode is switched from the absolute input mode into the relative input mode, there arises such a difficulty that the manipulation permitted range of the manipulation knob 18 required in the relative input mode cannot be ensured.

In view of the above-described difficulty, the reference position is set in the following ways. When the input mode is switched into the relative input mode while the cursor 40 is being located within the predetermined exclusion part $R_{ex.\ relat.}$, the controller 16 causes the force generation unit 24 to generate the drive force and causes the cursor 40 to forcibly move out of the predetermined exclusion part $R_{ex.\ relat.}$. Thereby, the cursor 40 is forcibly moved inside the predetermined un-exclusion part $R_{unex.\ relat.}$ surrounded by the predetermined exclusion part $R_{ex.\ relat.}$. After the above forcible movement is made, the reference position in the relative input mode is set as corresponding to the predetermined un-exclusion part $R_{unex.\ relat.}$. Thereby, the sufficient manipulation permitted range required in the relative input mode can be ensured.

According to an exemplary case shown in FIG. 10B, the cursor 40 is moved inside the predetermined un-exclusion part $R_{unex.\ relat.}$ so that the cursor 40 is located just inside the predetermined exclusion part $R_{ex.\ relat.}$. Thereby, it is possible to set a displacement amount of the cursor 40 due to the forcible adjustment as small as possible. Thereby, it is possible to minimize discomfort feeling to be provided to a user. If discomfort feeling due to the forcible adjustment is negligible, and if the force generation unit 24 has a sufficient power, the cursor 40 may be forcibly moved to the center of the window.

(Advantages)

The input device 1 according to one embodiment has the following advantages.

(1) According to the above-described first, second, third and fifth exemplary cases (see FIGS. 4A to 4D, 5A to 5D, 6A to 6F and 8A to 8C), the relative input mode is applied to an icon, a menu screen and an input coordinate system that are associated with the selection manipulation of the icon in the absolute input mode. According to the above manner, it is not necessary to move a cursor onto the newly-displayed icon from the icon associated with the selection manipulation of the icon in the absolute input mode. Thus, it is possible to immediately perform selection manipulation directed to the new-displayed icon in the relative mode. It is therefore possible to reduce effort and time for operation, and possible to improve operability.

(2) According to the above-described fourth exemplary case (see FIGS. 7A to 7C), the input mode is switched in accordance with an operation direction in such manner that the absolute input mode is applied to an operation in upward or downward directions, and the relative input mode is applied to an operation in leftward or rightward directions. According to the above manner, after an icon is selected by moving the cursor in the upward or downward direction in the absolute input mode, it becomes possible to immediately perform the leftward or rightward operation associated with the selection icon. It is thus possible to provide high accessibility. Further, in the operation in the relative input mode, it is not necessary to move a cursor to an icon. It is therefore possible to reduce effort and time for operation, and possible to improve operability.

(3) According to the sixth exemplary case (see FIGS. 9A and 9B), the window for the absolute input mode is displayed when the vehicle is making a stop, and the window for the relative input mode is displayed when the vehicle is traveling. According to the input device 1 of one embodiment, a user can perceive the movable region of the manipulation knob 18 by receiving tactile feeling caused by the resistance force acting on the manipulation knob 18. It is thus possible to provide intuitive operational feeling to a user. Accordingly, when the vehicle is traveling, by applying the relative input mode, it is possible to reduce time for a driver to gaze the display screen. When the vehicle is making a stop, by applying the absolute input mode, a user can perform delicate input and manipulation while watching the display screen.

(4) According to the first to sixth exemplary cases, when the manipulation knob 18 receives the load that is attempted to move the manipulation knob 18 beyond the manipulation permitted range determined by an arrangement of icons for the relative mode, the force generation unit generates the resistance force that corresponds to the load, so that a user can perceive tactile feeling representing the manipulation permitted range, which appears in response to transition to the relative input mode. According to the above manner, it is possible to reduce uncomfortable feeling or discomfort feeling due to an operational feeling change caused by the switching of the input mode between the absolute input mode and the relative input mode. Further, since the input device 1 provides click feeling when an icon is pointed in the relative input mode, it is possible to minimize the need for a user to watch the display screen and it is possible to minimize a wrong operation such as selection of an un-desired icon. It is therefore possible to improve operability.

(5) According to the input device 1 of one embodiment, if the position of the cursor is located around an outer boundary of the window at a time when the input mode is switched from the absolute input mode into the relative input mode, it is possible to set the reference position by moving the cursor to a place where the operation region required in the relative input can be ensured. Accordingly, when a layout of icons are designed, it becomes possible to neglect such a consideration that an icon should not be placed around the outer boundary of the window it is therefore possible to improve design freedom.

While the invention has been described above with reference to various embodiments thereof, it is to be understood that the invention is not limited to the above described embodiments and constructions. The invention is intended to cover various modifications and equivalent arrangements. In addition, while the various combinations and configurations described above are contemplated as embodying the invention, other combinations and configurations, including more, less or only a single element, are also contemplated as being within the scope of embodiments.

What is claimed is:

1. An input device for a vehicle, the input device (i) being communicatable with an in-vehicle apparatus of the vehicle and an external display unit that displays a window and a selectable image item for operation of the in-vehicle apparatus, (ii) enabling a user to input spatial data to the external display unit remotely from the external display unit, (iii) configured to determine a pointed point on the window based on the inputted spatial data, (iv) causing the external display unit to discriminably display information associated with the pointed point on the window, and (v) configured to receive a selection manipulation directed to the selectable image item located at the pointed point and configured to input data associate with the selection manipulation to the in-vehicle apparatus, the input device comprising:

a manipulation member that receives a load from the user and is two-dimensionally movable in a movable region in response to the load, the manipulation member being a single manipulation knob;

a force generation unit that generates and applies a force to the manipulation member, the force depending on a position of the manipulation member;

an input mode switch section that switches an input mode between an absolute input mode and a relative input mode, the switching of the input mode depending on a situation of an operation target of the subject input device, the input mode switch section in the absolute input mode (i) establishing one-to-one correspondence between a coordinate of the pointed point on an operation target region of the window and a coordinate of the manipulation member in the movable region, and (ii) determining the coordinate of the pointed point on the operation target region based on the one-to-one correspondence, the input mode switch section in the relative input mode determining the pointed point on the window in a relative manner based on a two-dimensional displacement of the manipulation member with respect to a reference position of the manipulation member in the movable region; and the same manipulation knob is consistently used in the absolute input mode and the relative input mode;

a setting section that sets the reference position of the manipulation member for the relative input mode when the input mode section switches the input mode from the absolute input mode into the relative input mode, in such manner that the reference position of the manipulation member is set to the position of the manipulation member in the absolute input mode that is being switched into the relative input mode;

a force control section that controls the force generation unit in the relative input mode, in such manner that:

when the manipulation member receives the load having a first property that causes the manipulation member to move beyond a predetermined manipulation permitted range, the force generation unit generates the force having a first property corresponding to the load having the first property to prohibit the manipulation member from moving beyond the predetermined manipulation permitted range, the predetermined manipulation permitted range depending on an arrangement of the selectable image item in the relative input mode, the selectable image item in the relative input mode being a selection target item in the relative input mode; and a controller that controls that the pointed point on the window, wherein:

the selectable image item displayed on the display unit includes a plurality of relative mode image items for use in the relative input mode and an absolute mode image item for use in the absolute input mode;

when the selection manipulation directed to the displayed absolute mode image item is performed in the absolute input mode, (i) the input mode switch section switches the input mode from the absolute input mode into the relative input mode, (ii) the setting section sets the reference position of the manipulation member to the position of the manipulation member at which the selection manipulation directed to the displayed absolute mode image item is performed in the absolute input mode, and (iii) the controller sets the pointed point to a point between the plurality of relative mode image items so that in a state where the manipulation member is positioned at the reference position set by the setting section, the pointed point on the window in the relative input mode is between the plurality of relative mode image items; and wherein the force control section controls the force generation unit to return the manipulation member to the reference position of the manipulation member and the controller returns the pointed point to a same point between the relative mode image items that the manipulation member selects in the relative input mode, the reference position being the position where the pointed point on the window is between the plurality of relative mode image items, when the load is no longer received by the manipulation member in the relative input mode.

2. The input device according to claim 1, wherein:
when the selection manipulation directed to the absolute mode image item is preformed in the absolute input mode, the plurality of relative mode image items is newly displayed on the window, and the input mode is switched into the relative input mode in which the newly displayed relative mode image items become the selection target item.

3. The input device according to claim 1, wherein:
the input mode switch section switches the input mode in accordance with a manipulation direction of the manipulation member.

4. The input device according to claim 1, wherein:
the input mode switch section causes the input mode to be in the absolute input mode when the subject vehicle is making a stop; and
the input mode switch section causes the input mode to be in the relative input mode when the subject vehicle is traveling.

5. The input device according to claim 1, wherein:
in the relative input mode, when the manipulation member receives the load having a second property that causes the manipulation member to displace within the predetermined manipulation permission region, the force generation unit generates the force having a second property; and
the force having the second property becomes minimum when the position of the manipulation member in the movable region indicates that the pointed point on the window matches the relative mode item on the window, and thereby providing click feeling to the user.

6. The input device according to claim 1, wherein:
the operation target region of the window has a predetermined exclusion part located along an outer boundary of the operation target region;
the operation target region further has a predetermined un-exclusion part surrounded by the predetermined exclusion part; and
if the pointed point is located within the predetermined exclusion part at a time when the input mode is switched from the absolute input mode into the relative input mode, the setting section sets the reference position in the relative input mode to the position of the manipulation member that corresponds to the predetermined un-exclusion part.

7. The input device according to claim 1, wherein:
displacement of the pointed point on the window in response to displacement of the manipulation member in the relative input mode is set larger than that in the absolute input mode.

8. The input device according to claim 1, wherein:
when, in the relative input mode, the manipulation member receives the load having a second property that causes the manipulation member to displace within the predetermined manipulation permission region, the force generation unit generates the force having a second property;
the force having the second property becomes minimum when the position of the manipulation member in the movable region corresponds to the position of each of the plurality of relative mode image items on the window, and thereby provides click feeling to the user;
the operation target region of the window has a predetermined exclusion part located along an outer boundary of the operation target region;
the operation target region further has a predetermined un-exclusion part surrounded by the predetermined exclusion part;
if the pointed point is located within the predetermined exclusion part at a time when the input mode is switched from the absolute input mode into the relative input mode, the setting section sets the reference position in the relative input mode to the position of the manipulation member that corresponds to the predetermined un-exclusion part;
displacement of the pointed point on the window in response to displacement of the manipulation member in the relative input mode is set larger than that in the absolute input mode;
the selectable image item includes an absolute mode image item for use in the absolute input mode in addition to the plurality of relative mode image items for use in the relative input mode;
in a first predetermined situation, when the selection manipulation directed to the absolute mode image item is preformed in the absolute input mode, the plurality of relative mode image items is newly displayed on the window, and the input mode is switched into the relative input mode in which the newly displayed relative mode image items become the selection target item;
in a second predetermined situation, the input mode switch section switches the input mode in accordance with a manipulation direction of the manipulation member in the movable region; and
in a third predetermined situation, the input mode switch section causes the input mode to be in the absolute input mode when the subject vehicle is making a stop, and causes the input mode to be in the relative input mode when the subject vehicle is traveling.

9. The input device according to claim 1, wherein:
the input mode switch section switches the input mode such that:
the input mode switch section applies the absolute input mode to movement of the manipulation member in the manipulation direction that corresponds to one of a vertical direction and a horizontal direction of the window; and
the input mode switch section applies the relative input mode to the movement of the manipulation member in the manipulation direction that corresponds to the other of the vertical direction and the horizontal direction of the window.

10. The input device according to claim 1, wherein:
in the absolute input mode, when the user stops applying the load to the manipulation member, the manipulation member does not return to a home position but stays at a position at which the user stops applying the load; and
in the relative input mode, when the user stops applying the load to the manipulation member, the force generation unit applies the force to the manipulation member, so that the manipulation member returns to the reference position.

11. The input device according to claim 1, wherein:
once the setting section sets the reference position of the manipulation member in response to switching the input mode from the absolute input mode into the relative input mode, the reference position of the manipulation member is fixed during the relative input mode.

12. An input device for remotely controlling a pointer on a display and remotely selecting an icon on the display in a vehicle, the input device comprising:
a single manipulation knob that is two-dimensionally movable in a movable range to change position of the pointer on the display, wherein the same single manipulation knob consistently determines the position of the pointer on the display consistently in both of:
an absolute input mode in which (i) a one-to-one correspondence between a coordinate of the pointer on the display and a coordinate of the manipulation knob in the movable range is established and (ii) the position of the pointer on the display is determined from the one-to-one correspondence; and
a relative input mode in which (i) the position of the pointer on the display screen is determined from displacement of the manipulation knob with respect to a reference position of the manipulation knob, (ii) the reference position of the manipulation knob is the position of the manipulation knob at which the input mode is switched from the absolute input mode to the relative input mod and (iii) movement of the pointer per unit displacement of the manipulation knob in the relative input is larger than that in the absolute input mode,
an input mode switch section that, in response to selection of an icon, switches from the absolute input mode to the relative input mode and changes the position of the pointer from the selected icon to a point between other icons; and
a force generator that applies a force to the manipulation knob so that in the relative input mode, the pointer is attracted toward the point between the other icons which is a same point between the other icons that the manipulation knob selects in the relative input mode.

* * * * *